(12) United States Patent
Scott et al.

(10) Patent No.: US 10,135,523 B2
(45) Date of Patent: *Nov. 20, 2018

(54) HITLESS REARRANGEMENT OF A SATELLITE-HOSTED SWITCH VIA PROPAGATED SYNCHRONIZATION

(71) Applicant: THE BOEING COMPANY, Chicago, IL (US)

(72) Inventors: James P. Scott, Manhattan Beach, CA (US); Mark A. Hoffmeyer, Torrance, CA (US); Harry E. Nichols, Cypress, CA (US); Kristina Miller, Redondo Beach, CA (US)

(73) Assignee: THE BOEING COMPANY, Chicago, IL (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/954,049

(22) Filed: Apr. 16, 2018

(65) Prior Publication Data

US 2018/0241465 A1    Aug. 23, 2018

Related U.S. Application Data

(63) Continuation of application No. 14/265,392, filed on Apr. 30, 2014, now Pat. No. 9,973,265.

(51) Int. Cl.
*H04B 7/185* (2006.01)
*H04W 72/04* (2009.01)

(52) U.S. Cl.
CPC ..... *H04B 7/18513* (2013.01); *H04B 7/18515* (2013.01); *H04W 72/0453* (2013.01)

(58) Field of Classification Search
CPC ........... H04B 7/18513; H04B 7/18515; H04W 72/0453
See application file for complete search history.

(56) References Cited

U.S. PATENT DOCUMENTS 5,426,378 A    6/1995   Ong
5,463,486 A    10/1995  Stevens
(Continued)

FOREIGN PATENT DOCUMENTS

WO    2004073229    8/2004

OTHER PUBLICATIONS

R.E. Lyons et al., "The Use of Triple-Modular Redundancy to Improve Computer Reliability", IBM Journal, Apr. 1962, pp. 200-209.

(Continued)

*Primary Examiner* — Un C Cho
*Assistant Examiner* — Jeremy Costin
(74) *Attorney, Agent, or Firm* — Womble Bond Dickinson (US) LLP (57) ABSTRACT

An apparatus includes an analog front end to receive an analog input including user data, and an analog-to-digital converter to convert the analog input to digital signals including the user data. A digital channelizer may process the digital signals to generate frequency slices of user data, and a digital combiner may assemble the frequency slices to form output sub-bands of user data. A digital switch may route the frequency slices from the digital channelizer to the digital combiner according to a selected map of a plurality of available maps. The apparatus also includes a map selector to communicate map select data that indicates the selected map. The digital channelizer may receive and insert the map select data into the frequency slices in-band with the user data thereof. And the digital switch may interpret the map select data inserted into and route the frequency slices according to the selected map.

18 Claims, 5 Drawing Sheets

(56) References Cited

U.S. PATENT DOCUMENTS

| | | |
|---|---|---|
| 5,471,332 A | 11/1995 | Shiragaki et al. |
| 5,740,211 A | 4/1998 | Beddrosian |
| 5,978,370 A | 11/1999 | Shively |
| 6,298,289 B1 | 10/2001 | Lloyd |
| 7,036,059 B1 | 4/2006 | Carmichael |
| 7,139,291 B2 | 11/2006 | Arbel et al. |
| 7,184,432 B2 | 2/2007 | Adam et al. |
| 7,301,941 B2 | 11/2007 | Daily |
| 7,542,716 B2 | 6/2009 | Bell et al. |
| 8,064,920 B2 | 11/2011 | Bell et al. |
| 2002/0001305 A1 | 1/2002 | Hughes et al. |
| 2003/0118013 A1 | 6/2003 | Steele |
| 2004/0095025 A1 | 5/2004 | Adam |
| 2004/0185775 A1 | 9/2004 | Bell |
| 2013/0148570 A1 | 6/2013 | Miller et al. |
| 2013/0182639 A1 | 7/2013 | Scott |
| 2013/0331026 A1 | 12/2013 | O'Neill |

OTHER PUBLICATIONS

International Search Report and Written Opinion dated Jul. 3, 2015 for International Application No. PCT/US2015/028012.
CLOS, "A Study of Non-Blocking Switching Networks", Bell System Technical Journal, vol. 32, No. 2, Mar. 1953, pp. 406-424.
Jajszczyk, "Design of Switching Networks Composed of Uniform Time-Space Elements", 11th International Teletraffic Congress, Kyoto 1985; Elsevier Science Publishers, 1985, 8 pgs.
Turner et al., "Multirate Clos Networks", Communications Magazine, IEEE, Vol. 41, Issue 10, Oct. 2003, 11 pgs.

HITLESS REARRANGEMENT OF A SATELLITE-HOSTED SWITCH VIA PROPAGATED SYNCHRONIZATION

CROSS-REFERENCE TO RELATED APPLICATION(S)

The present application is a continuation of U.S. patent application Ser. No. 14/265,392, entitled: Hitless Rearrangement of a Satellite-Hosted Switch via Propagated Synchronization, filed Apr. 30, 2014, now U.S. Pat. No. 9,973,265, issued May 15, 2018, which is related to U.S. patent application Ser. No. 13/666,449, entitled: Satellite Communication Data Processing, filed on Nov. 1, 2012, now U.S. Pat. No. 9,954,602, issued Apr. 24, 2018, the content of both of which are incorporated herein by reference in their entireties.

TECHNOLOGICAL FIELD

The present disclosure relates generally to satellite communications systems and, in particular, to processing data by a transponder on a satellite of a satellite communications system.

BACKGROUND

Satellites are used in a variety of diverse fields such as for navigation, communication, environmental monitoring, weather forecasting, broadcasting and the like. Many homes, businesses, government organizations and other users may use satellites on a daily basis for entertainment, communication, information gathering and other purposes. Hundreds of man-made satellites now orbit the earth, and more are launched each year.

A typical modern satellite may include a metal or composite frame that carries one or more antennas, a power source such as solar cells, and various electronic components. The electronic components on a satellite may include one or more transponders. The transponders may be clusters of electronic components including one or more receivers, frequency translators and transmitters. Each transponder may be configured for a particular bandwidth. The total bandwidth of the satellite may be provided by the number of transponders.

The transponders on a communications satellite may be configured to receive multiple uplink beams from the earth, another satellite, or other stationary or mobile locations via uplink antennas. Each of the received beams may be amplified and down-converted for further processing by the transponders. The down-converted beams then may be switched, multiplexed or otherwise routed and combined prior to up-conversion and re-transmission on a downlink beam to the earth, other satellite, or other stationary or mobile location via a downlink antenna.

The transponders on a communications satellite may be analog or digital. For analog transponders, switching may be limited to point-to-point mapping of entire uplink antenna beams to particular downlink antenna beams. A digital transponder on a communications satellite may provide the functionality of the transponder using digital signal processing. A digital transponder may be configured to divide, control and monitor bandwidths and power allocations for communications signals onboard the satellite in a manner that may not be achieved with an analog transponder.

A digital transponder may have the ability to perform switching of inputs to outputs in a highly flexible manner. A number of transponders employ a switch including a multiple stage switch network such as a Clos switch network with multiple stages of switches through which paths or connections may be made between inputs and outputs. And some of these multiple stage switch networks are rearrangeable non-blocking (RANB) in that an idle input may always be connected to an idle output without disrupting other existing connections between inputs and outputs (non-blocking) and through one or more stages of switches therebetween, but doing so may require rearranging one or more existing connections (rearrangeable).

In instances in which a connection through a multiple stage switch network is rearranged, it is often desirable if not required that the process of rearranging the connection does not cause any outage (lost data, "hitless") in traffic over the connection. Conventional networks accomplish this by setting up a redundant connection between the connection's input and output (make-before-break), but this undesirably increases the complexity of the algorithm according to which the network and connections through the network are controlled. And building in an allowance for redundant connections undesirably reduces the capacity of the switch network.

Accordingly, it would be beneficial to have a method and apparatus that takes into account one or more of the issues discussed above as well as possibly other issues.

BRIEF SUMMARY

Example implementations of the present disclosure are generally directed to an improved technique for rearrangement of a satellite-hosted switch without any loss in traffic over the connection (hitless), and without requiring a redundant connection. The technique of example implementations may at times be referred to as propagated synchronization. Example implementations may therefore at times be said to provide hitless rearrangement of a satellite-hosted switch via propagated synchronization.

According to one aspect of example implementations of the present disclosure, an apparatus is provided that includes an analog front end (AFE), analog-to-digital converter (ADC), digital channelizer, digital combiner and digital switch, and in some examples may be configured as a payload of a communications satellite. The AFE is configured to receive an analog input including user data, and the ADC is configured to convert the analog input to digital signals including the user data. The digital channelizer is configured to process the digital signals to generate a plurality of frequency slices of user data, and the digital combiner is configured to assemble the plurality of frequency slices to form output sub-bands of user data. And the digital switch includes a multiple stage switch network configured to route the plurality of frequency slices from the digital channelizer to the digital combiner according to a selected map of a plurality of available maps.

According to this aspect of example implementations, the apparatus also includes a map selector configured to communicate map select data that indicates the selected map. The digital channelizer, then, is configured to receive and insert the map select data into the plurality of frequency slices in-band with the user data thereof. And the multiple stage switch network is configured to interpret the map select data inserted into and route the plurality of frequency slices through the multiple stage switch network according to the selected map.

In some examples, the map selector includes a plurality of redundant logic configured to receive an input signal and output respective map select data, and voting logic configured to receive the respective map select data and output the map select data consistent with a majority of the respective map select data.

In some examples, the apparatus further includes a configuration memory configured to store the plurality of available maps, and which may be fault-tolerant. In these examples, the configuration memory (e.g., fault-tolerant configuration memory) may be configured to receive the map select data from the map selector, and in response thereto, communicate map data including the selected map for receipt by the multiple stage switch network.

In some examples, the digital channelizer may include frequency slicing logic and a framer. The frequency slicing logic may be configured to generate the plurality of frequency slices of user data. The framer may be configured to frame the plurality of frequency slices of user data with a particular frame structure to produce a frame of user data. And the framer may be configured to receive and insert the map select data into the frame in-band with the user data thereof.

In some further examples, the multiple stage switch network includes groups of switches arranged in a plurality of stages. In these further examples, each switch of the groups of switches may include a deframer, crossbar switch, map select logic and framer. The deframer may be configured to extract the map select data from the frame of user data, and deframe the frame to produce a second plurality of frequency slices of user data. The crossbar switch may be configured to receive the second plurality of frequency slices from the deframer, and route the second plurality of frequency slices therethrough. The map select logic may be configured to receive the map select data from the deframer, and cause the crossbar switch to route the second plurality of frequency slices according to the selected map indicated by the map select data. And the framer may be configured to frame the second plurality of frequency slices routed through the crossbar switch with a particular frame structure to produce a second frame of user data. Similar to the framer of the digital channelizer, this framer may also be configured to receive and insert the map select data into the second frame in-band with the user data thereof.

In some examples, each switch of the groups of switches may include first and second buffer memories, and which similar to the configuration memory may be fault-tolerant. The first buffer memory (e.g., first fault-tolerant buffer memory) may be configured to store the selected map, and the second buffer memory (e.g., second fault-tolerant buffer memory) may be configured to store another selected map of the plurality of available maps, which may be stored in the second buffer memory as the plurality of frequency slices are routed through the multiple stage switch network according to the selected map stored in the first buffer memory. The multiple stage switch network, then, may be configured to route a subsequent plurality of frequency slices of other user data according to the other selected map stored in the second buffer memory. Here, the digital channelizer may have inserted map select data that indicates the other selected map into the subsequent plurality of frequency slices in-band with the other user data thereof.

In some examples, the apparatus may further include a digital-to-analog converter (DAC) configured to convert the output sub-bands to an analog output including the user data, and an analog back end (ABE) configured to transmit the analog output. In some further examples, the AFE may be configured to receive the analog input including a first plurality of bandwidths and a first plurality of interface frequencies, and the ABE may be configured to transmit the analog output including a second plurality of bandwidths and a second plurality of interface frequencies.

In other aspects of example implementations, a method is provided. The features, functions and advantages discussed herein may be achieved independently in various example implementations or may be combined in yet other example implementations further details of which may be seen with reference to the following description and drawings.

BRIEF DESCRIPTION OF THE DRAWING(S)

Having thus described example implementations of the disclosure in general terms, reference will now be made to the accompanying drawings, which are not necessarily drawn to scale, and wherein:

DETAILED DESCRIPTION

Some implementations of the present disclosure will now be described more fully hereinafter with reference to the accompanying drawings, in which some, but not all implementations of the disclosure are shown. Indeed, various implementations of the disclosure may be embodied in many different forms and should not be construed as limited to the implementations set forth herein; rather, these example implementations are provided so that this disclosure will be thorough and complete, and will fully convey the scope of the disclosure to those skilled in the art. Like reference numerals refer to like elements throughout.

Example implementations of the present disclosure are directed to processing data by a transponder on a satellite. As described herein, the term "satellite" may be used without loss of generality and include other types of relay and distribution apparatuses, which in various examples may be located on land or onboard a mobile platform (e.g., land vehicle, aircraft, spacecraft, watercraft). Thus, although the communications system of example implementations may be shown and described as including one or more "satellites," the term may be used more broadly to include one or more relay and distribution apparatuses.

Figure 1:
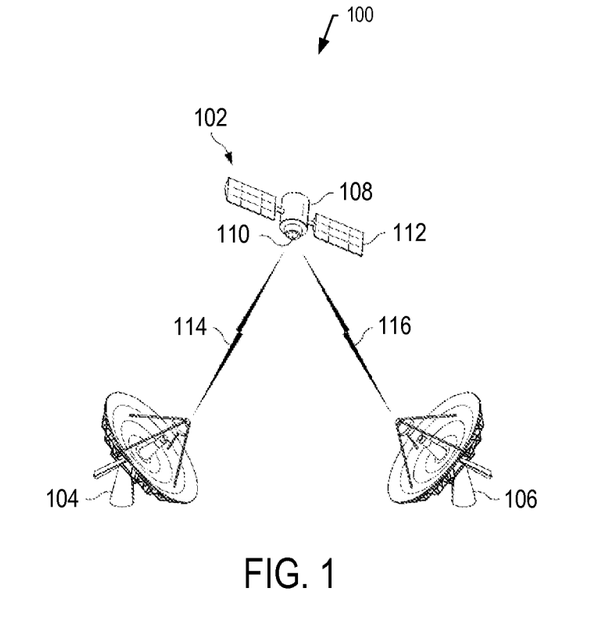
FIG. 1 illustrates a satellite communications system according to example implementations of the present disclosure.

FIG. 1 illustrates a satellite communications system 100 in accordance with one example implementation of the present disclosure. As shown, the satellite communications system may include a satellite 102 configured to provide communication of data between ground stations 104, 106. In other examples, the satellite may be configured to provide communication of data between and among any combination of any number of ground stations, other satellites or other stationary or mobile locations on or above a rotating astronomical object such as the earth.

The satellite 102 may include a housing 108 on which one or more antennas 110, solar panels 112 and the like may be mounted. The antennas may be configured to receive uplink beams 114 such as from a ground station 104 (or another transmitter), and transmit downlink beams 116 such as to another ground station 106 (or another receiver). The antennas may be of any of a number of different types of antennas appropriate for use on a satellite 102. Examples of suitable types of antennas include digital or analog beam forming antennas having any number of independently addressable transmit or receive elements. And suitable examples of these types of antennas include spot beam dishes, multi-beam feed antennas, direct radiating array antennas, phased array-fed reflector antennas and the like.

The housing 108 of the satellite 102 may contain various electronic components configured to process uplink beams 114 received via the antennas 110, and configured to generate downlink beams 116 for transmission via the antennas. In this regard, the housing may contain a payload including one or more transponders configured to switch and sub-channel route uplink beams to downlink beams.

The solar panels 112 mounted to the housing 108 may be one example of a power source for providing power for operation of the various electronic components in the housing. In some examples, the satellite 102 may include a battery in the housing or utilize one or more other power sources or various combinations of power sources to provide power for the operation of the electronics in the housing.

Figure 2:
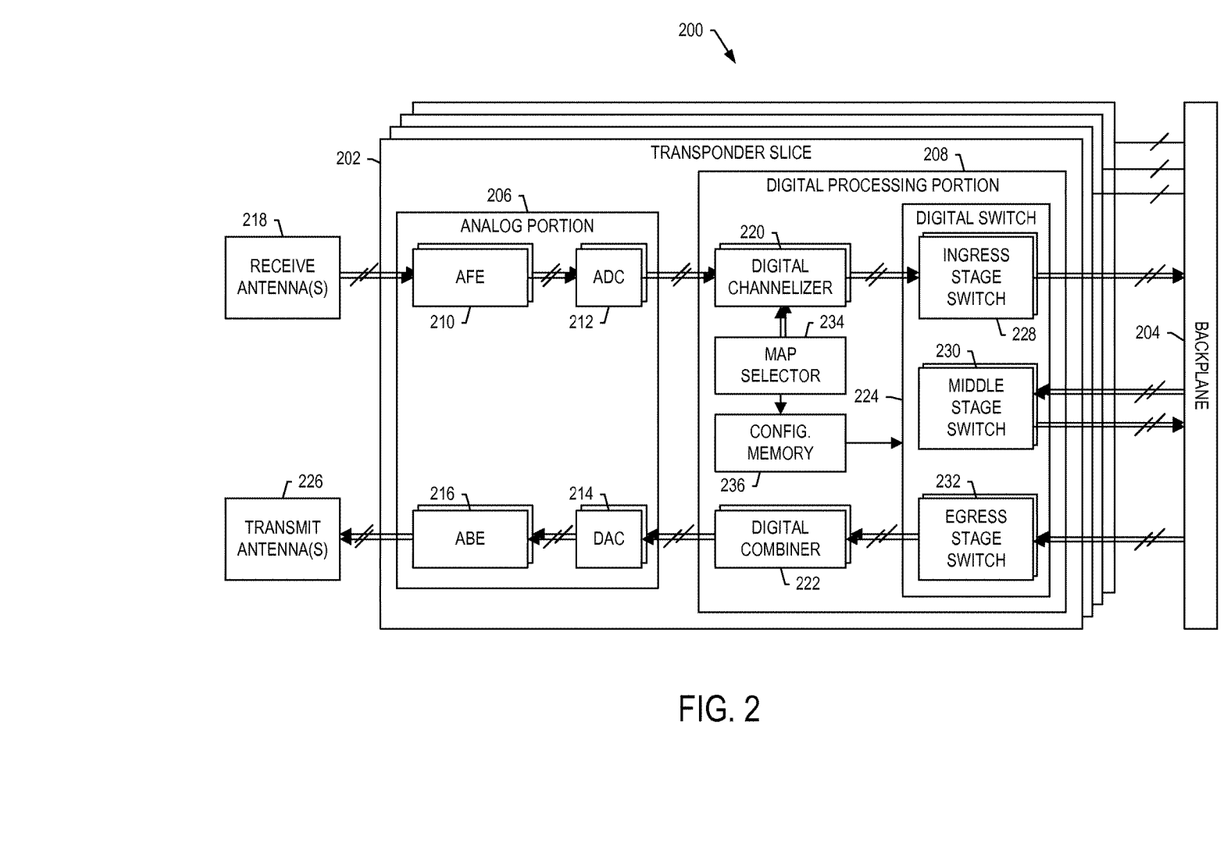
FIG. 2 illustrates a transponder that may be found onboard a satellite of a satellite communications system, according to example implementations.

FIG. 2 illustrates a block diagram of a transponder 200 that in some examples may correspond to a transponder found in the payload of a satellite such as the satellite 102 of FIG. 1. The transponder includes a number of components configured to perform operations to carry out those of the transponder. But it should be noted that FIG. 2 is not meant to imply physical or architectural limitations of example implementations of the transponder. In this regard, the transponder may include other components in addition to, in place of or both in addition to and in place of one or more of those illustrated in FIG. 2. Some components may be unnecessary in some example implementations. It should also be understood that the operations of some of the components may be functionally combined or divided across one or more components in different example implementations.

As shown, the transponder 200 may include a plurality of transponder slices 202 connected to a backplane 204 configured to provide a connection for the communication of digital signals between and among the transponder slices, and which in some examples may be implemented as part of a housing configured for containing the transponder slices. In some examples, the transponder slices may be implemented on respective circuit boards that may be plugged into the backplane to connect together the transponder slices via the backplane. In this regard, the transponder slices may be implemented as modular building blocks; and different versions of the transponder may provide different processing capacity by connecting an appropriate number of transponder slices to the backplane.

As described below, each of the transponder slices may include a number of components. These components may be implemented in any of a number of different manners. In some examples, components of a transponder slice may be implemented by circuitry mounted to a circuit board of the transponder slice. This circuitry may be composed of a collection of electronic circuits some of which may be packaged as an integrated circuit or multiple interconnected integrated circuits (an integrated circuit at times more commonly referred to as a "chip"). The integrated circuit(s) may include any of a number of different types of analog, digital and/or mixed signal (analog and digital) integrated circuit(s). Examples of suitable types of integrated circuits include a general purpose processor, content-addressable memory, digital signal processor (DSP), application specific integrated circuit (ASIC), field programmable gate array (FPGA), any suitable programmable logic device, discrete gate or transistor logic, discrete hardware components or any combination thereof.

A transponder slice 202 of the transponder slices of the transponder 200 will now be described with greater particularity. It should be understood that each of the others of the transponder slices may be implemented in a similar manner, and may have identical hardware configurations. As shown, the transponder slice 202 may include an analog portion 206 and a digital processing portion 208. Various components and functionality of the analog portion and digital portion are described below. Other possible components and functionality is described in the above referenced and incorporated '449 application.

The analog portion 206 may in turn include one or more of each of a number of components including an analog front end (AFE) 210, analog-to-digital converter (ADC) 212, digital-to-analog converter (DAC) 214 and analog back end (ABE) 216. The AFE may be configured to receive an analog input including user data, and the AFE may receive this analog input from one or more receive antennas 218. These receive antennas may at times be referred to as uplink antennas, and include any appropriate number and type of antennas on a satellite configured to receive uplink beams of user data as analog input to the analog front end. And the ADC may be configured to convert this analog input to digital signals including the user data for processing by the digital processing portion 208.

The digital processing portion 208 may include one or more of each of a number of components including a digital channelizer 220 configured to process the digital signals provided by ADC 212 to generate a plurality of frequency slices of user data, and a digital combiner 222 configured to assemble the frequency slices to form output sub-bands of user data for processing by the DAC 214 and ABE 216. And coupled to and between the digital channelizer and digital combiner, the digital processing portion may include a digital switch 224 configured to route the frequency slices generated by digital channelizer to the digital combiner. The digital switch also may be configured to route frequency slices generated by its digital channelizer to digital combiners on others of the transponder slices 202. Similarly, the digital switch may be configured to route frequency slices generated by digital channelizers on others of the transponder slices to its digital combiner.

The DAC 214 may be configured to receive the output sub-bands from the digital combiner 222, and convert the output sub-bands to an analog output including the user data. The ABE 216 may be configured to transmit the analog output via one or more transmit antennas 226. These transmit antennas may at times be referred to as downlink antennas, and include any appropriate number and type of antennas on a satellite configured to transmit an analog output from the analog back end as downlink beams.

The analog portion 206 and digital processing portion 208 may be configured to provide processing for user data over a continuous set of frequencies spanning a certain bandwidth, with the frequencies at times referred to as interface frequencies. In some examples, the bandwidth (and thus the interface frequencies) may be arbitrarily split into a plurality of portions each of which may be itself a bandwidth (for a plurality of bandwidths over which respective interface frequencies span). Relative to the AFE 210, the bandwidth and interface frequencies—or portions of bandwidth and interface frequencies into which the bandwidth may be split—may at times be referred to as one or more first bandwidths and first interface frequencies. And relative to the ABE 216, the bandwidth(s) and interface frequencies may at times be referred to as one or more second bandwidths and second interface frequencies.

In some examples, the analog portion 206 may be selectively configured for different first bandwidths/interface frequencies and/or different second bandwidths/interface frequencies without changing its hardware configuration, or the hardware configuration of its AFE 210 and/or ABE 216. For example, the analog portion may be selectively configured for first and/or second bandwidths of 500 MHz, 250 MHz, 125 MHz or other bandwidths or combinations of bandwidths, and for any number of different interface frequencies spanning the configured bandwidth. For a first and/or second bandwidth of 500 MHz, for example, the analog portion may be selectively configured for first and/or second interface frequencies of any of 83-583 MHz, 750-1250 MHz, 1416-1916 MHz or other interface frequencies spanning a bandwidth of 500 MHz. And continuing the example, the analog portion may be selectively configured to receive the bandwidth and interface frequencies that span it in any of a number of different portions, such as one 500 MHz portion (one first bandwidth), two 250 MHz portions (two first bandwidths), a 250 MHz portion and two 125 MHz portions (three first bandwidths), four 125 MHz portions, or the like.

In some more particular examples, the analog portion 206 and digital processing portion 208 may be configured to provide processing for interface frequencies spanning N units of frequency (e.g., MHz) of bandwidth. In these examples, the AFE 210 may include n input ports, and the ABE 216 may include m output ports, where n and m may be the same number or different numbers of ports. And here, the analog portion may be configured to allow flexible selection of the bandwidths and/or interface frequencies for the n input ports and m output ports.

Further to the aforementioned examples, the N units of frequency (e.g., MHz) of bandwidth may be arbitrarily split across the n input ports of the AFE 210, and may likewise be arbitrarily split across the m output ports of the ABE 216. In this manner, each of the n input ports may provide N/n units of frequency of bandwidth, and each of the m output ports may provide N/m units of frequency of bandwidth. Each of the n input ports may be configured to provide the same or different bandwidth as each of m output ports. Thus, in one example in which the analog portion 206 and digital processing portion 208 are configured to provide processing for 500 MHz of bandwidth, the analog portion may include one 500 MHz input port (n=1) and one 500 MHz output port (m=1). In other examples, the analog portion may include two 250 MHz input ports (n=2) and two 250 MHz output ports (m=2), four 125 MHz input ports (n=4) and four 125 MHz output ports (m=4), or another number of input ports and output ports where the total bandwidth of all of the input ports is 500 MHz, and the total bandwidth of all of the output ports is 500 MHz.

In the digital processing portion 208, the digital channelizer 220 may be configured to process the digital signals derived from the analog input to generate frequency slices, which the digital switch 224 then may be configured to route from the digital channelizer to the digital combiner 222. Examples of suitable types of digital switches include a crossbar switch, multiple stage switch network or the like. A crossbar switch may at times be referred to as a cross-point switch, crosspoint switch or matrix switch; and in some examples, a crossbar switch may be implemented as an assembly of individual switches arranged in a matrix.

A multiple stage switch network may include groups of switches (e.g., crossbar switches) arranged in a plurality of stages, such as in a multiple stage switch network. As shown in some examples, then, the digital switch 224 may include a multiple stage switch network such as a Clos switch network with ingress stage switches 228, middle stage switches 230 and egress stage switches 232. In some examples, the switches of the various stages may be simply referred to as ingress switches, middle switches and egress switches. In a transponder slice 202 and across the transponder slices, the frequency slices of user data may be routed by the ingress stage switches from digital channelizer 220 to the middle stage switches, from the middle stage switches to the egress stage switches, and from the egress stage switches to the digital combiner 222.

The frequency slices of user data routed to or from various stage switches of a transponder slice 202 may be routed within the transponder, as well as across the backplane 204 to or from others of the transponder slices. Thus, for example, the ingress stage switches 228 of a transponder slice may be configured to route frequency slices from the digital channelizer 220 to the middle stage switches 230 within the transponder slice, and across the backplane to the middle stage switches of others of the transponder slices. The middle stage switches may be configured to route frequency slices from the ingress stage switches within the transponder slice, and across the backplane from the ingress stage switches of others of the transponder slices; and route these frequency slices to the egress stage switches 232 within the transponder slice, and across to the egress stage switches of others of the transponder slices. And the egress stage switches may be configured to route frequency slices from the middle stage switches within the transponder slice, and across the backplane from the middle stage switches of others of the transponder slices; and route these frequency slices to the digital combiner 222.

In some examples, the digital switch 224 may be configured to route frequency slices of user data from the digital channelizer 220 to the digital combiner 222 in a rearrangeable non-blocking (RANB) manner. In this regard, frequency slices provided on any input to the digital switch may be routed by the digital switch to any input of the digital combiner, but doing so may require rearranging one or more existing connections between the digital channelizer and digital combiner via the digital switch. In some examples, the digital switch may be implemented in a manner such that any unused input on the ingress stage switches 228 may be connected to any unused output on the egress stage switches 232 to route frequency slices from the digital channelizer to the digital combiner with or without having to rearrange existing connections.

As explained in the background section above, in instances in which a connection through a multiple stage switch network is rearranged, conventional networks set up a redundant connection between the connection's input and output (make-before-break). But this undesirably increases the complexity of the algorithm according to which the network and connections through the network are controlled, and reduces the capacity of the network. Example implementations of the present disclosure therefore provide an improved technique (propagated synchronization) for rearrangement of the digital switch 224 (a satellite-hosted switch) without any loss in communication over the connection (hitless), and without requiring a redundant connection.

In accordance with example implementations, paths or connections through the multiple stage switch network of the digital switch 224 may be specified by maps. More specifically, for example, a map may specify mappings of traffic through each (e.g., inputs to outputs of each) of the multiple stage switch network's ingress stage switches 228, middle stage switches 230 and egress stage switches 232. There may be a plurality of available maps, and each may be indicated by map select data. For example, the map select data may include a single bit that indicates one of two maps (e.g., bit 0=map A; bit 1=map B), two bits that indicate one of up to four maps (e.g., bits 00=map A; bits 01=map B; bits 10=map C; bits 11=map D), or the like.

Also in accordance with example implementations, the multiple stage switch network of the digital switch 224 may be configured to route the frequency slices from the digital channelizer 220 to the digital combiner 222 according to any map selected from a plurality of available maps. In this regard, the transponder slice 202 may further include a map selector 234 configured to communicate map select data that indicates a selected map of the plurality of maps, and a configuration memory 236 configured to store the plurality of available maps. The digital channelizer may be configured to receive and insert the map select data into the plurality of frequency slices in-band with the user data thereof. The configuration memory may be configured to receive the map select data from the map selector, and in response thereto, communicate map data including the selected map for receipt by the multiple stage switch network. And the multiple stage switch network may be configured to interpret the map select data inserted into and route the frequency slices through the multiple stage switch network according to the selected map.

Figure 3:
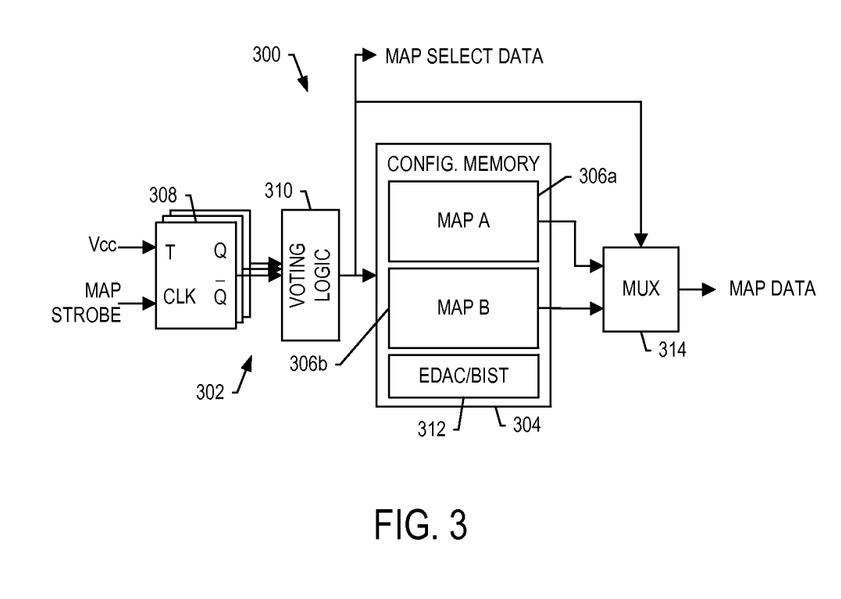
FIGS. 3 and 4 illustrate arrangements that in some example implementations may correspond to various components of the transponder shown in FIG. 2.
Figure 4:
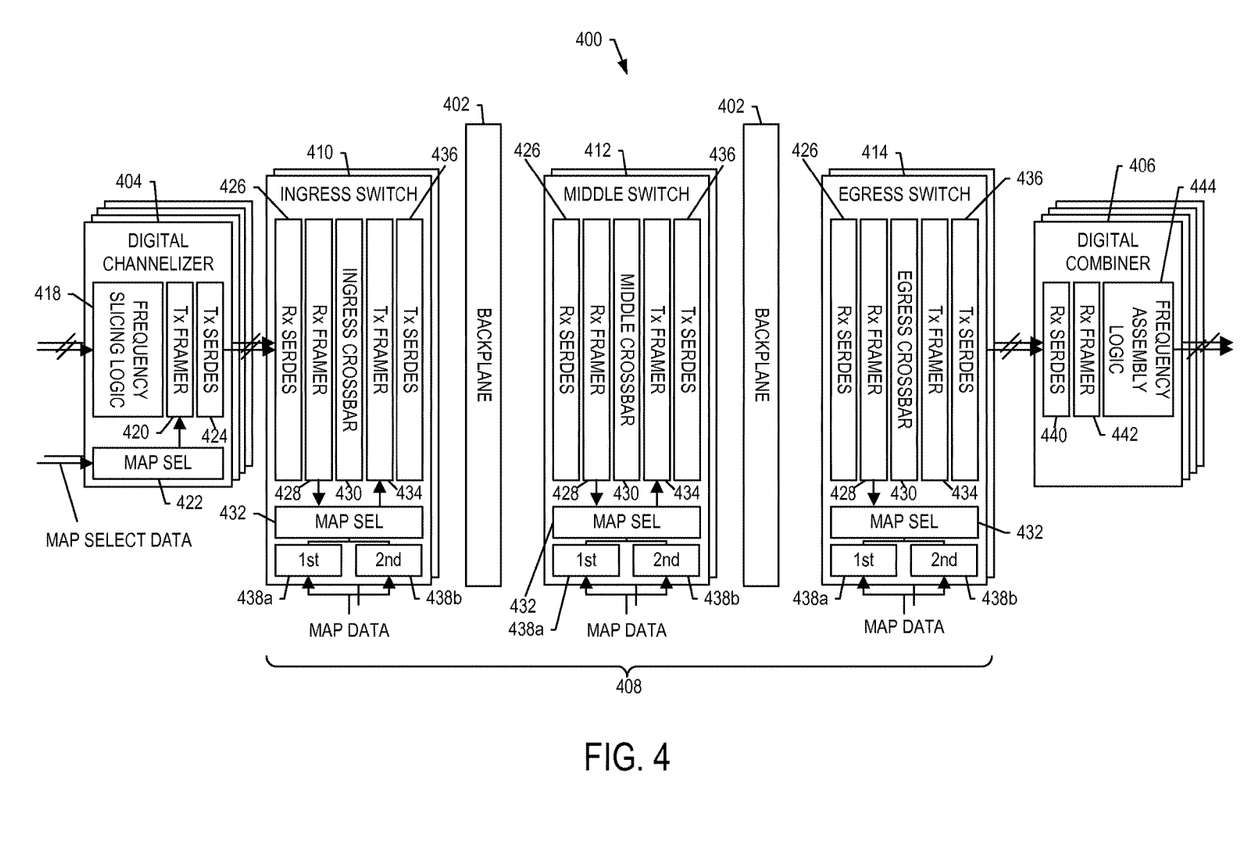

FIGS. 3 and 4 illustrate arrangements that in some example implementations of the present disclosure may correspond to various components of the transponder shown in FIG. 2. These examples will be described in the context of two available maps referred to as maps A and B, though it should be understood that example implementations of the present disclosure may accompany greater than two maps.

FIG. 3 illustrates an arrangement 300 that in some examples may correspond to the map selector 234 and configuration memory 236 shown in FIG. 2. As shown, the arrangement may include a map selector 302 (e.g., map selector 234) configured to communicate map select data that indicates a selected map of a plurality of maps. The map selector may be coupled to a configuration memory 304 (e.g., configuration memory 236) configured to store the plurality of available maps—shown for example as map A 306a and map B 306b.

In some examples, the arrangement 300 may employ a number of design tactics designed to increase the robustness of the arrangement for use onboard a communications satellite deployed in the harsh environment of space. As shown, the map selector 302 may be fault-tolerant, and in some examples include a plurality of redundant logic such as T flip-flops 308 coupled to voting logic 310. The configuration memory may be a fault-tolerant configuration memory that includes one or more protection mechanisms 312 for the maps stored therein, such as error detect and correct (EDAC) protected memories, built-in self-test (BIST) logic or the like.

The T flip-flops 308 may be configured to receive an input signal (e.g., map strobe) that indicates a desired map, and output respective map select data. The voting logic 310 may be configured to receive the respective map select data and output the map select data consistent with a majority of the respective map select data. As indicated above, in some examples, the map select data may include a single bit that indicates one of two maps (e.g., bit 0=map A; bit 1=map B), two bits that indicate one of up to four maps (e.g., bits 00=map A; bits 01=map B; bits 10=map C; bits 11=map D), or the like. The voting logic may output the map select data to a digital channelizer as indicated above and described more fully below. The voting logic may also output the map select data to the configuration memory 304 and a multiplexer 314 coupled to an output of the configuration memory. In response, the configuration memory may output maps A and B 306a, 306b to the multiplexer, which may select and output map data including the selected one of the maps indicated by the map select data. This map data may be communicated to the multiple stage switch network of a digital switch as indicated above and described more fully below.

FIG. 4 illustrates an arrangement 400 including one or more of each of a backplane 402, digital channelizer 404, digital combiner 406 and digital switch 408 of a transponder slice, which in some examples may correspond to respective ones of the backplane 204, digital channelizer 220, digital combiner 222 and digital switch 224 shown in FIG. 2. As shown, the digital switch may include a multiple stage switch network such as a Clos switch network with ingress stage switches 410 (e.g., ingress stage switches 228), middle stage switches 412 (e.g., middle stage switches 230) and egress stage switches 414 (e.g., egress stage switches 232). Again, in the transponder slice and across the transponder slices via the backplane, the frequency slices of user data may be routed by the ingress stage switches from the digital channelizer to the middle stage switches, from the middle stage switches to the egress stage switches, and from the egress stage switches to the digital combiner.

As shown in FIG. 4, for example, the digital channelizer 404 may include frequency slicing logic 418, framer 420 and map select 422. The frequency logic may be configured to generate a plurality of frequency slices of user data. The framer—shown in FIG. 4 as a transmit (Tx) framer—may be configured to frame the plurality of frequency slices of user data with a particular frame structure to produce a frame of user data (including multiple frames in some examples). The map select logic may be configured to receive map select data such as from a map selector (e.g., map selector 234), and transmit the map select data to the framer for insertion into the frame in-band with the user data thereof (i.e., of the frame).

In some examples, the digital channelizer 404 may also include a serializer that is shown in FIG. 4 as a Tx serializer/deserializer (SERDES) 424. The seralizer may be configured to serialize the frame of user data or otherwise convert it from a parallel form to a serial form for transmission to the multiple stage switch network 408. As used herein, the term SERDES may imply that the deserializer includes the functionality of both a serializer and deserializer, and in some examples a component with both functionality may be employed as the deserializer.

In the multiple stage switch network 408, each of its ingress stage switches 410, middle stage switches 412 and egress stage switches 414 may include a deserializer 426, deframer 428, crossbar switch 430, map select logic 432, framer 434 and serializer 436. At an ingress stage switch, the deseralizer—shown in FIG. 4 as a receive (Rx) SERDES—may be configured to deserialize the frame of user data from the digital channelizer 404, or otherwise convert it from its serial form back to a parallel form. The deframer (shown in FIG. 4 as an Rx framer) may be configured to extract the map select data from the frame of user data, and deframe the frame to produce a second plurality of frequency slices of user data.

Continuing at the ingress stage switch, the crossbar switch 430 may be configured to receive the second plurality of frequency slices from the deframer 428, and route the second plurality of frequency slices through it, such as from any of a plurality of input ports to any of a plurality of output ports. The map select logic 432 may be configured to receive the map select data from the deframer, and cause the crossbar switch to route the second plurality of frequency slices from its input to its output according to the selected map indicated by the map select data. The framer 434 may be configured to frame the second plurality of frequency slices routed through the crossbar switch with a particular frame structure to produce a second frame of user data. In addition, the framer may be configured to receive the map select data (from the map select logic), and insert it into the second frame in-band with the user data. And the serializer 436 may then again serialize the second frame of user data or otherwise convert it from a parallel form to a serial form for transmission to the switches in the next stage in the multiple stage switch network 408, namely the middle stage switches 412. The middle stage switches may include similar components that function in a similar manner to those described above with respect to the ingress stage switches 410, and which may route frames of user data on to the last stage of switches, namely the egress stage switches 414. And from the egress stage switches, frames of user data may be transmitted to the digital combiner 406. In some examples, the framer of each egress stage switch may not insert the map select data back into the frame since the map select data may not be required by the digital combiner.

As also shown in FIG. 4, each of the ingress stage switches 410, middle stage switches 412 and egress stage switches 414 may include first and second buffer memories 438a, 438b, which in some examples may be fault-tolerant buffer memories. These buffer memories may function to implement multiple buffering of maps of the available maps to facilitate the multiple stage switch network 408 routing different frames of user data according to different maps. In this regard, the first buffer memory may be configured to store the selected map. The second buffer memory may be configured to store another selected map of the plurality of available maps. Here, the other selected map may be stored in the second buffer memory as the plurality of frequency slices are routed through the multiple stage switch network according to the selected map stored in the first buffer memory. The multiple stage switch network, then, may be configured to route a subsequent plurality of frequency slices of other user data according to the other selected map stored in the second buffer memory, the digital channelizer having inserted map select data that indicates the other selected map into the subsequent plurality of frequency slices in-band with the other user data.

From the output of the multiple stage switch network 408, the digital combiner 406 may include a deserializer 440, deframer 442 and frequency assembly logic 444. The digital combiner may receive the user data in a frame and in a serial form. The deserializer may be configured to deserialize the frame of user data from the digital multiple stage switch network, and the deframer may be configured to deframe the frame to again produce frequency slices of user data. The frequency assembly logic may be configured to assemble the frequency slices to form output sub-bands of user data. And these output sub-bands may be transmitted such as to a DAC (e.g., 214) and ABE (e.g., ABE 216), such as in the manner described above with respect to FIG. 2.

Figure 5:
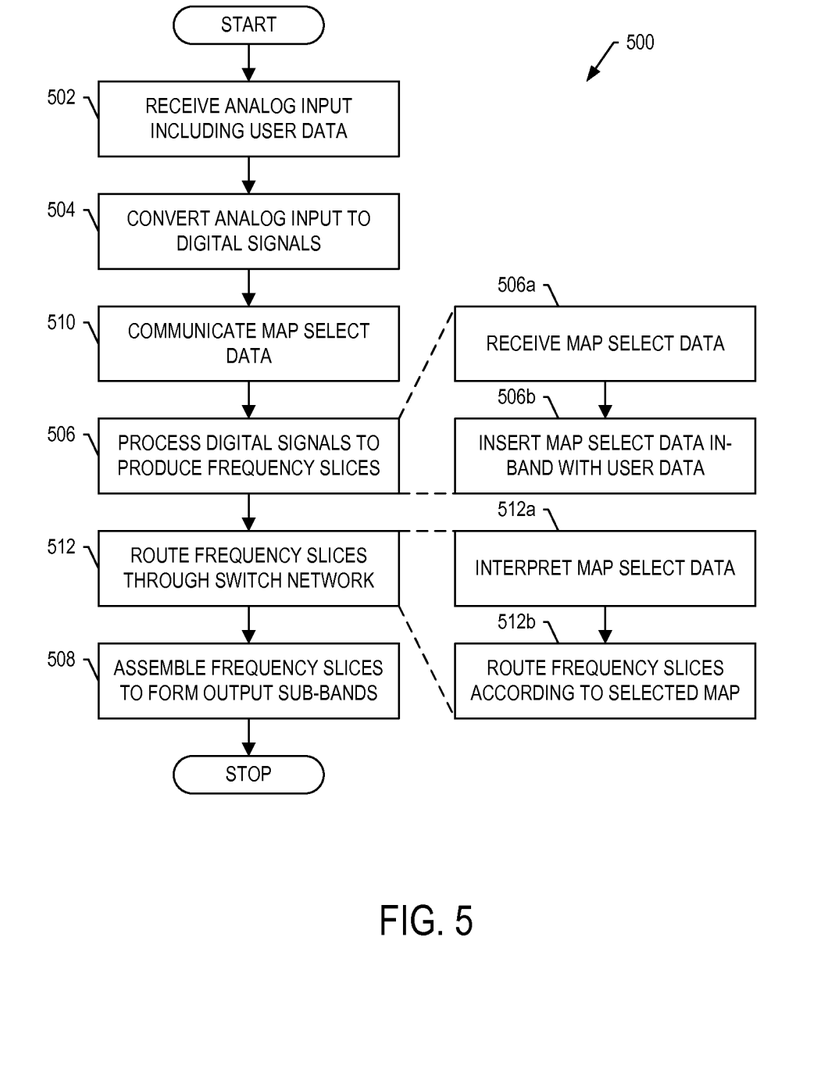
FIG. 5 illustrates a flowchart including various operations in a method according to aspects of example implementations.

FIG. 5 illustrates a flowchart including various operations in a method 500 according to aspects of example implementations of the present disclosure. As shown at blocks 502 and 504, the method may include receiving an analog input including user data, and converting the analog input to digital signals including the user data. The method may include processing the digital signals to generate a plurality of frequency slices of user data, and assembling the plurality of frequency slices to form output sub-bands of user data, as shown at blocks 506 and 508. Before processing the digital signals and between it and assembling the plurality of frequency slices, the method may include communicating map select data that indicates a selected map of a plurality of available maps, and routing the plurality of frequency slices through a digital switch including a multiple stage switch network according to the selected map, as shown in blocks 510 and 512. In this regard, processing the digital signals may include receiving and inserting the map select data into the plurality of frequency slices in-band with the user data thereof, as shown in sub-blocks 506a and 506b. And routing the plurality of frequency slices may include interpreting the map select data inserted into the plurality of frequency slices and routing the plurality of frequency slices through the multiple stage switch network according to the selected map, as shown in blocks 512a and 512b.

Many modifications and other implementations of the disclosure set forth herein will come to mind to one skilled in the art to which this disclosure pertains having the benefit of the teachings presented in the foregoing description and the associated drawings. Therefore, it is to be understood that the disclosure not to be limited to the specific implementations disclosed and that modifications and other implementations are intended to be included within the scope of the appended claims. Moreover, although the foregoing descriptions and the associated drawings describe example implementations in the context of certain example combinations of elements and/or functions, it should be appreciated that different combinations of elements and/or functions may be provided by alternative implementations without departing from the scope of the appended claims. In this regard, for example, different combinations of elements and/or functions than those explicitly described above are also contemplated as may be set forth in some of the appended claims. Although specific terms are employed herein, they are used in a generic and descriptive sense only and not for purposes of limitation.

What is claimed is:

1. An apparatus comprising:
    an analog front end configured to receive an analog input including user data;
    an analog-to-digital converter configured to convert the analog input to digital signals including the user data;
    a digital channelizer configured to process the digital signals to generate a plurality of frequency slices of user data, frame the plurality of frequency slices to produce a frame of user data, and convert the frame of user data from a parallel form to a serial form;
    a digital combiner configured to assemble the plurality of frequency slices to form output sub-bands of user data;
    a digital switch including a multiple stage switch network configured to route the plurality of frequency slices from the digital channelizer to the digital combiner according to a selected map of a plurality of available maps; and a map selector configured to communicate map select data that indicates the selected map, the digital channelizer being configured to receive and insert the map select data into the frame of user data in-band with the user data thereof, the multiple stage switch network being configured to interpret the map select data inserted into and route the plurality of frequency slices through the multiple stage switch network according to the selected map, wherein the multiple stage switch network includes groups of switches each switch of which includes:
 a deserializer configured to convert the frame of user data from the serial form back to the parallel form;
 a deframer configured to extract the map select data from the frame of user data in the parallel form, and deframe the frame of user data to produce a second plurality of frequency slices of user data;
 a crossbar switch configured to route the second plurality of frequency slices therethrough according to the selected map indicated by the map select data;
 a framer configured to frame the second plurality of frequency slices routed through the crossbar switch to produce a second frame of user data, and insert the map select data into the second frame in-band with the user data thereof; and
 a serializer configured to convert the second frame of user data from the parallel form to the serial form.

2. The apparatus of claim 1, wherein the map selector includes:
 a plurality of redundant logic configured to receive an input signal and output respective map select data; and
 voting logic configured to receive the respective map select data and output the map select data consistent with a majority of the respective map select data.

3. The apparatus of claim 1 further comprising:
a configuration memory configured to store the plurality of available maps, the configuration memory being configured to receive the map select data from the map selector, and in response thereto, communicate map data including the selected map for receipt by the multiple stage switch network.

4. The apparatus of claim 1, wherein the digital channelizer includes:
 frequency slicing logic configured to generate the plurality of frequency slices of user data; and
 a framer configured to frame the plurality of frequency slices of user data with a particular frame structure to produce the frame of user data, the framer being configured to receive and insert the map select data into the frame in-band with the user data thereof.

5. The apparatus of claim 4, wherein each switch of the groups of switches further includes map select logic configured to receive the map select data from the deframer, and cause the crossbar switch to route the second plurality of frequency slices according to the selected map indicated by the map select data.

6. The apparatus of claim 1, wherein each switch of the groups of switches further includes:
 a first buffer memory configured to store the selected map; and
 a second buffer memory configured to store another selected map of the plurality of available maps, the other selected map being stored in the second buffer memory as the plurality of frequency slices are routed through the multiple stage switch network according to the selected map stored in the first buffer memory,
 wherein the multiple stage switch network is configured to route a subsequent plurality of frequency slices of other user data according to the other selected map stored in the second buffer memory, the digital channelizer having inserted map select data that indicates the other selected map into the subsequent plurality of frequency slices in-band with the other user data thereof.

7. The apparatus of claim 1 configured as a payload of a communications satellite.

8. The apparatus of claim 1 further comprising:
 a digital-to-analog converter configured to convert the output sub-bands to an analog output including the user data; and
 an analog back end configured to transmit the analog output.

9. The apparatus of claim 8, wherein the analog front end is configured to receive the analog input including a first plurality of bandwidths and a first plurality of interface frequencies, and
 wherein the analog back end is configured to transmit the analog output including a second plurality of bandwidths and a second plurality of interface frequencies.

10. A method comprising:
receiving an analog input including user data;
converting the analog input to digital signals including the user data;
processing the digital signals to generate a plurality of frequency slices of user data, framing the plurality of frequency slices to produce a frame of user data, and converting the frame of user data from a parallel form to a serial form;
assembling the plurality of frequency slices to form output sub-bands of user data;
routing the plurality of frequency slices through a digital switch including a multiple stage switch network between processing the digital signals and assembling the plurality of frequency slices, the plurality of frequency slices being routed through the multiple stage switch network according to a selected map of a plurality of available maps; and
communicating map select data that indicates the selected map,
wherein processing the digital signals includes receiving and inserting the map select data into the frame of user data in-band with the user data thereof, and routing the plurality of frequency slices includes interpreting the map select data inserted into and routing the plurality of frequency slices through the multiple stage switch network according to the selected map, and
wherein the multiple stage switch network includes groups of switches, and for each switch of which, routing the plurality of frequency slices includes:
 converting the frame of user data from the serial form back to the parallel form;
 extracting the map select data from the frame of user data in the parallel form, and deframing the frame of user data to produce a second plurality of frequency slices of user data;
 routing the second plurality of frequency slices through a crossbar switch according to the selected map indicated by the map select data;
 framing the second plurality of frequency slices routed through the crossbar switch to produce a second frame of user data, and inserting the map select data into the second frame in-band with the user data thereof; and converting the second frame of user data from the parallel form to the serial form.

11. The method of claim 10, wherein communicating map select data includes:
   receiving an input signal at a plurality of redundant logic and outputting respective map select data therefrom; and
   receiving the respective map select data at voting logic and outputting therefrom, the map select data consistent with a majority of the respective map select data.

12. The method of claim 10 further comprising:
   storing the plurality of available maps in a configuration memory; and
   receiving the map select data at the configuration memory, and in response thereto, communicating map data including the selected map for receipt by the multiple stage switch network.

13. The method of claim 10, wherein processing the digital signals includes:
   generating the plurality of frequency slices of user data; and
   framing the plurality of frequency slices of user data with a particular frame structure to produce the frame of user data, including receiving and inserting the map select data into the frame in-band with the user data thereof.

14. The method of claim 13, wherein for each switch of the groups of switches, routing the plurality of frequency slices further includes map select logic receiving the map select data, and causing the crossbar switch to route the second plurality of frequency slices according to the selected map indicated by the map select data.

15. The method of claim 10, wherein for each switch of the groups of switches, routing the plurality of frequency slices further includes:
   storing the selected map at a first buffer memory; and
   storing another selected map of the plurality of available maps at a second buffer memory, the other selected map being stored in the second buffer memory as the plurality of frequency slices are routed through the multiple stage switch network according to the selected map stored in the first buffer memory,
   wherein the method further includes routing a subsequent plurality of frequency slices of other user data through the multiple stage switch network according to the other selected map stored in the second buffer memory, the map select data that indicates the other selected map having been inserted into the subsequent plurality of frequency slices in-band with the other user data thereof.

16. The method of claim 10 performed by an apparatus configured as a payload of a communications satellite.

17. The method of claim 10 further comprising:
   converting the output sub-bands to an analog output including the user data; and
   transmitting the analog output.

18. The method of claim 17, wherein receiving the analog input includes receiving the analog input including a first plurality of bandwidths and a first plurality of interface frequencies, and
   wherein transmitting the analog output includes transmitting the analog output including a second plurality of bandwidths and a second plurality of interface frequencies.

* * * * *